United States Patent
Biggerstaff et al.

(10) Patent No.: US 10,299,433 B2
(45) Date of Patent: May 28, 2019

(54) UNLOADING CONVEYOR SWING CONTROL SYSTEM

(71) Applicant: AGCO Corporation, Hesston, KS (US)

(72) Inventors: Joseph M. Biggerstaff, Wichita, KS (US); Gerald R. Johnson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 228 days.

(21) Appl. No.: 15/528,176

(22) PCT Filed: Oct. 20, 2015

(86) PCT No.: PCT/IB2015/001948
§ 371 (c)(1),
(2) Date: May 19, 2017

(87) PCT Pub. No.: WO2016/079580
PCT Pub. Date: May 26, 2016

(65) Prior Publication Data
US 2018/0310475 A1    Nov. 1, 2018

Related U.S. Application Data

(60) Provisional application No. 62/081,872, filed on Nov. 19, 2014.

(51) Int. Cl.
*A01D 41/12*    (2006.01)
*A01D 61/00*    (2006.01)
(Continued)

(52) U.S. Cl.
CPC ..... *A01D 41/1217* (2013.01); *A01D 43/0635* (2013.01); *A01D 61/00* (2013.01); *B65G 33/24* (2013.01)

(58) Field of Classification Search
CPC .. B65G 33/24; A01D 41/1217; A01D 41/127; A01D 41/12; A01D 43/07; A01D 43/073; A01D 61/00; A01D 43/0635
(Continued)

(56) References Cited

U.S. PATENT DOCUMENTS 6,638,159 B2    10/2003  Krone et al.
8,626,406 B2 *  1/2014   Schleicher ......... A01D 41/1278
                                                    701/24
(Continued)

FOREIGN PATENT DOCUMENTS

GB         2517049 A1    2/2015

OTHER PUBLICATIONS

UK Intellectual Property Office, International Search Report for Related UK Application No. GB 1421967.9, dated May 21, 2015.
(Continued)

*Primary Examiner* — James R Bidwell

(57) ABSTRACT

An unloading conveyor swing control system including an unloading conveyor fitted to a self-propelled harvesting machine such as a combine harvester. The conveyor is moveable around a pivot axis through a movement range between a first, stowed, position and a second position. An actuator is connected to the conveyor and arranged to move the conveyor throughout the movement range. A sensor is configured to sense an angular position of the conveyor within the movement range and generate a representative position signal. A user interface device is provided for receiving user-commands to move the conveyor. A controller is in communication with the sensor, the actuator and the user interface device. The conveyor is automatically moved into the stowed position in response to an angular position falling below a predetermined threshold angle.

10 Claims, 4 Drawing Sheets

(51) Int. Cl.
*A01D 43/063* (2006.01)
*B65G 33/24* (2006.01)

(58) Field of Classification Search
USPC .................. 56/10.2 R; 198/861.6, 670, 301
See application file for complete search history.

(56) References Cited

U.S. PATENT DOCUMENTS

| | | | |
|---|---|---|---|
| 9,332,692 B2* | 5/2016 | Krause | A01D 57/00 |
| 9,861,040 B2* | 1/2018 | Bonefas | A01D 43/073 |
| 10,034,427 B2* | 7/2018 | Krause | A01D 43/073 |
| 2004/0013506 A1* | 1/2004 | Guhr | A01D 41/1217 |
| | | | 414/526 |
| 2004/0053653 A1* | 3/2004 | Isfort | A01D 43/087 |
| | | | 460/119 |
| 2010/0009731 A1* | 1/2010 | Coers | A01D 41/1217 |
| | | | 460/1 |
| 2010/0108188 A1* | 5/2010 | Correns | A01D 43/087 |
| | | | 141/83 |
| 2010/0332051 A1* | 12/2010 | Kormann | A01D 43/073 |
| | | | 701/2 |
| 2012/0263560 A1* | 10/2012 | Diekhans | A01D 43/087 |
| | | | 414/294 |
| 2013/0096782 A1* | 4/2013 | Good | A01D 41/1217 |
| | | | 701/50 |
| 2014/0311113 A1* | 10/2014 | Bonefas | A01D 34/001 |
| | | | 56/10.2 R |

OTHER PUBLICATIONS

European Patent Office, International Search Report for International Patent Application No. PCT/IB2015/001948, dated Feb. 22, 2016.

* cited by examiner

UNLOADING CONVEYOR SWING CONTROL SYSTEM

BACKGROUND

Technical Field

The invention relates to unloading conveyors fitted to self-propelled harvesting machines, the conveyors being pivotable between a stowed, generally longitudinal, position and a deployed, generally transverse, position. In particular, the invention relates to a control system for controlling the movement of the conveyor between the stowed and deployed positions.

Description of Related Art

Self-propelled harvesting machines include, by way of example, combine harvesters and forage harvesters, both including an elongate unloading conveyor that is typically moveable around a pivot axis through a movement range between a first, stowed, position and a second, deployed, position. In the deployed position the conveyor extends generally transverse to the forward direction of travel and crop is discharged by the conveyor into a cart or trailer hauled alongside. Due to the excessive width when in the deployed position, the conveyor is swung around the pivot axis into the stowed position for transport wherein the axis of the conveyor is generally parallel to the longitudinal axis of the machine.

Movement of the unloading conveyor is normally brought about by an actuator connected between the harvester frame and the conveyor. A user interface, typically in the form of a pair of press-buttons or a rocker switch, allows a driver to issue commands to a controller in communication with the actuator for swinging the conveyor within the movement range as the operator desires. During unloading, the operator may fine-tune the position of the conveyor within a narrow range of angles so as to lop-off the trailer. When the unloading is finished and the conveyor is deactivated, the conveyor is often swung into the stowed position to minimise the risk of collision with field objects such as electricity pylons. This stowing action requires the operator to maintain pressure on the associated button for a period in the region of 13 seconds.

The harvesting operation does not generally cease during unloading. Therefore, the operator is required to monitor and control the unloading process whilst also maintaining attention on the harvesting operation.

SUMMARY OF INVENTION

It is an object of the invention to provide a more user-friendly control system for unloader conveyors.

In accordance with the invention there is provided an unloading conveyor swing control system comprising an unloading conveyor fitted to a self-propelled harvesting machine, the conveyor being moveable around a pivot axis through a movement range between a first, stowed, position and a second position, an actuator connected to the conveyor and arranged to move the conveyor throughout the movement range, a sensor configured to sense an angular position of the conveyor within the movement range and generate a representative position signal, a user interface device for receiving user-commands to move the conveyor, and a controller in communication with the sensor, the actuator and the user interface device, wherein the conveyor is automatically moved into the first position in response to said angular position falling below a predetermined threshold angle.

The invention advantageously removes the need for the operator to maintain pressure on the associated button to stow the conveyor once the angular position has fallen below a predetermined angle. By automatically moving the conveyor into the stowed position when the angular position thereof falls below a predetermined threshold angle, the operator can release the associated button (or user interface device) and return his focus to the harvesting task in hand.

The invention involves the recognition that once the operator has swung the conveyor beyond the normal range of 'topping off' angles then it can reasonably be assumed that the operator wishes to stow the conveyor. Therefore, the invention provides that the controller automatically assumes the stowing operation allowing the operator to release the associated button.

The range of movement of the conveyor around the pivot axis is generally around or greater than 90 degrees, wherein, at one extreme, the conveyor is in the stowed position with its axis generally aligned with the longitudinal axis of the harvester and, at the other extreme, the conveyor is forward of transverse, or over-centre, at an angle of around 105 degrees to the stowed position.

An operating, or unloading, range may be defined between the threshold angle and the second position, wherein the second position equates to the aforementioned over-centre position. In this case, the operator may command movement of the conveyor within the operating range without the controller automatically taking control. In other words, movement of the conveyor is directly attributed to operation of the associated buttons or rocker switch.

The threshold angle, and thus the operating range is preferably user-adjustable. Advantageously, this allows the operator at the start of harvesting to enter the angular position below which the controller automatically assumes the stowing action of the conveyor. For example, this may be chosen as the angle at which the remote end of the conveyor goes out of sight.

The user interface device preferably comprises a first press-button for increasing the angular position, and a second press button for decreasing the angular position. The two press buttons may be embodied within a single rocker switch.

In a preferred embodiment the conveyor is automatically moved into the operating range in response to user-operation of the first press button. In this case, a single press of the first press button initiates deployment of the conveyor from the stowed position.

The sensor may comprise a potentiometer coupled to the conveyor to sense the angular position thereof. The sensor may sense the position of the conveyor directly or, alternatively, indirectly by integration thereof into the actuator.

The invention lends itself to any self-propelled harvester having a swingable unloading conveyor. However, the invention is particularly beneficial when applied to a combine harvester wherein the unloading conveyor comprises a tube, an auger rotationally housed within the tube, and a discharge spout, the tube being pivotally mounted to a frame of the combine harvester. However, it should be understood that the invention is by no means limited to an auger and may also be embodied within a belt unloader or a blower-based unloading system for example.

BRIEF DESCRIPTION OF DRAWINGS

Further advantages of the invention will become apparent from reading the following description of a specific embodiment with reference to the appended drawings in which.

DETAILED DESCRIPTION OF A SPECIFIC EMBODIMENT

Figure 1:
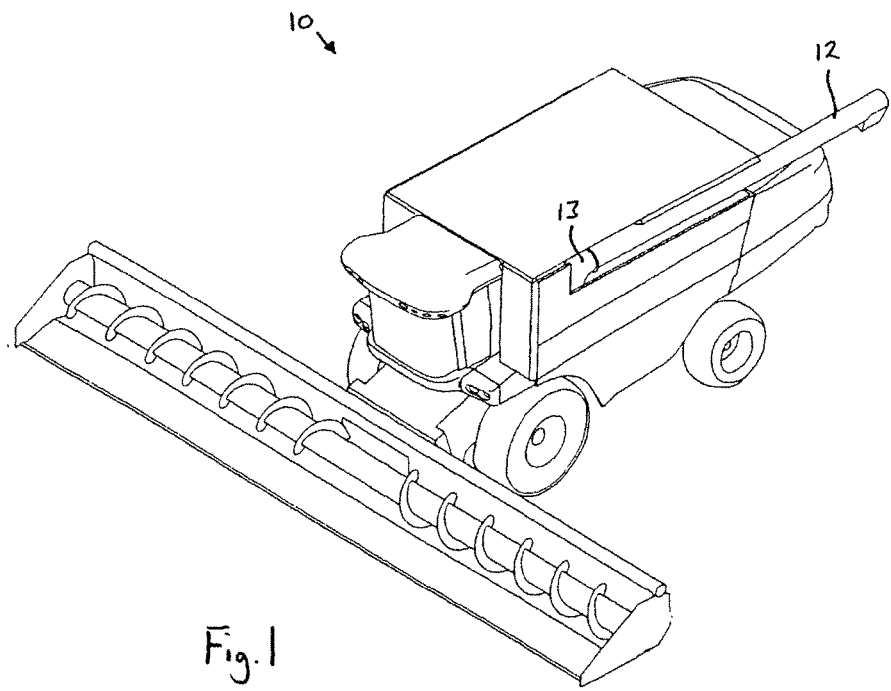
FIG. 1 is a perspective view of a combine harvester embodying an unloading conveyor swing control system in accordance with the principles of the invention.

With reference to FIG. 1 a combine harvester 10 is shown in front perspective view with its unloading auger tube 12 shown in the stowed position wherein the elongate axis thereof is substantially parallel to the longitudinal axis of the combine 10. It should be understood that the invention can be applied to other self-propelled harvesters such as forage harvesters or sugar cane harvesters for example. Furthermore, it should be understood that the invention is not limited to auger type unloading conveyors and may extend for example to belt unloaders or blower based systems.

In the illustrated embodiment auger tube 12 is generally cylindrical and at a first end is sealed to an elbow joint 13 which connects the auger tube 12 to an upright conveyor (not shown). Auger tube 12 pivots around an upright swing axis 14 which is affected by a freedom of the elbow 13 to pivot around the upright conveyor. It should be understood that the construction of the unloading conveyor itself is known in the art.

Figure 2:
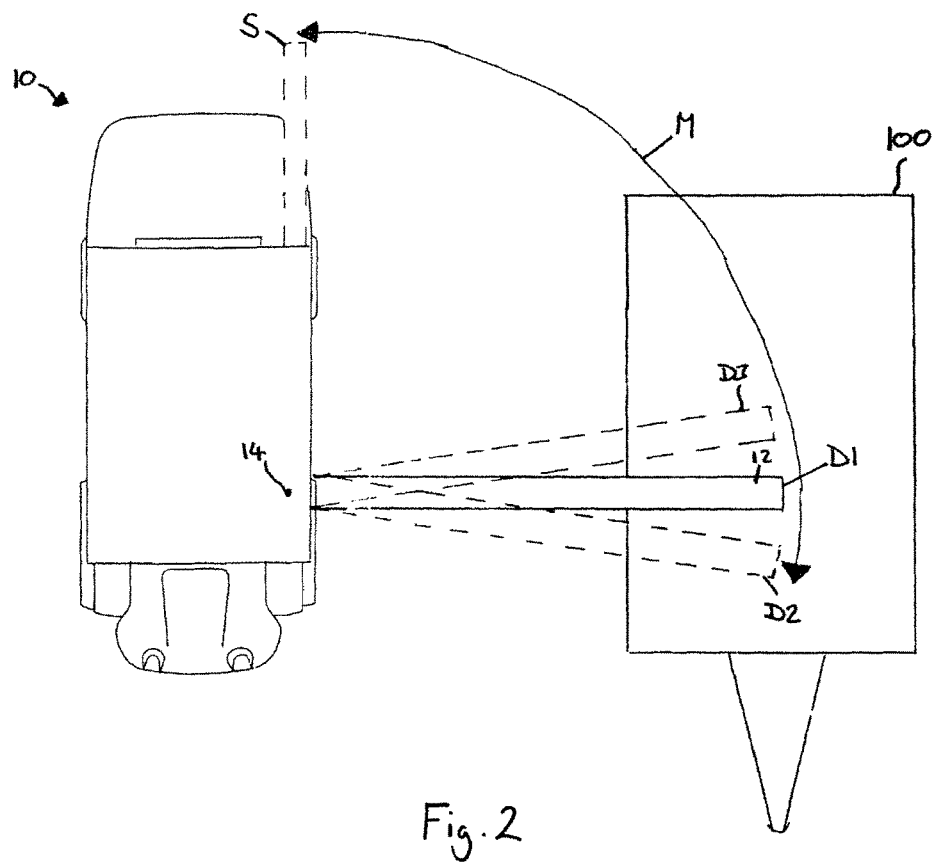
FIG. 2 is a schematic plan view of the combine harvester of FIG. 1 shown without the header but showing a grain cart alongside and showing the unloading conveyor in several different positions.

With reference to FIG. 2, auger tube 12 is shown in solid-line a deployed position D1 wherein the tube axis extends substantially transverse (90 degrees) to the longitudinal axis of the combine 10. The auger tube 12 has freedom to pivot around axis 14 within a movement range indicated by arrow M. From the example deployed position D1 auger tube 12 can pivot forwardly to an 'over-centre' position D2 which is, in this example, at 104 degrees to the longitudinal axis and represents one end limit of the movement range M. In a third illustrated deployed position D3 the auger tube 12 resides at 83 degrees to the longitudinal axis.

The stowed position S is illustrated in FIG. 2 in dashed line form and represents the opposite limit of the movement range M.

Figure 3:
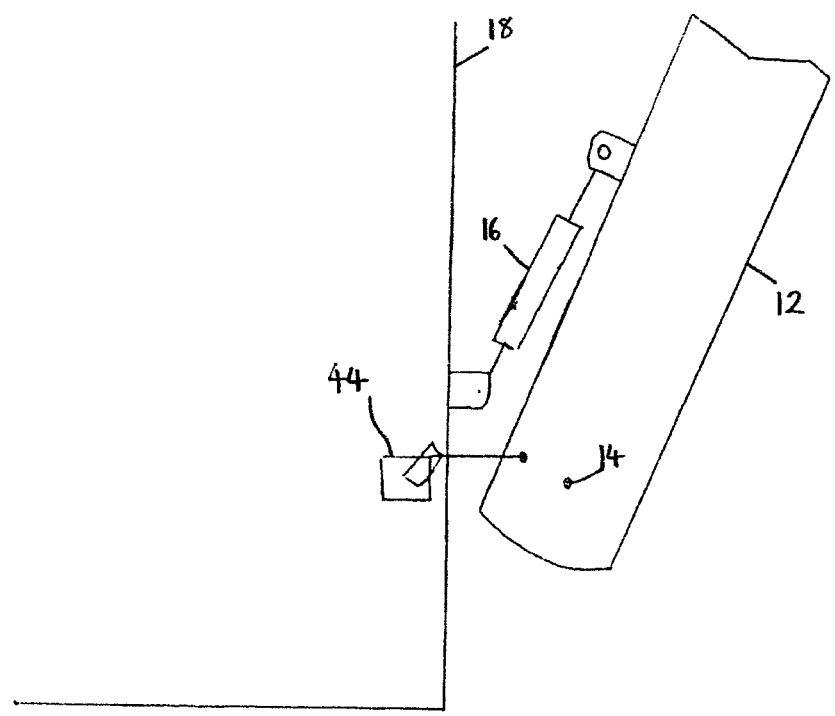
FIG. 3 is an enlarged schematic plan view of the region of the unloading conveyor pivot axis illustrating the actuator and position sensor.

As shown in FIG. 3, a hydraulic actuator 16 is connected in a known manner between the auger tube 12 and a frame member 18 of the combine 10. Hydraulic signals sent to the hydraulic cylinder 16 cause extension and retraction thereof so as to effect deployment and retraction of auger tube 12 as required.

Sensor 44 comprises a potentiometer having a mechanical linkage connected to auger tube 12 and as illustrated in FIG. 3. The potentiometer generates a signal representative of the angular position of auger tube 12, said signal being communicated by a data bus 46 to the controller 42.

During unloading, grain is discharged through auger tube 12 into a grain cart 100 driven alongside. To facilitate the driver in 'topping off' the grain in the trailer, the auger tube 12 can be moved within an operating range defined, in this example, between deployed positions D2 and D3.

Although illustrated as a cylindrical auger tube 12 which is swingable substantially within a horizontal plane, it is envisaged that the invention can be embodied in unloading conveyors which swing or pivot around non-vertical axes between a deployed position and a stowed position. In such examples, the elongate axis of the conveyor may be inclined to the horizontal.

Figure 4:
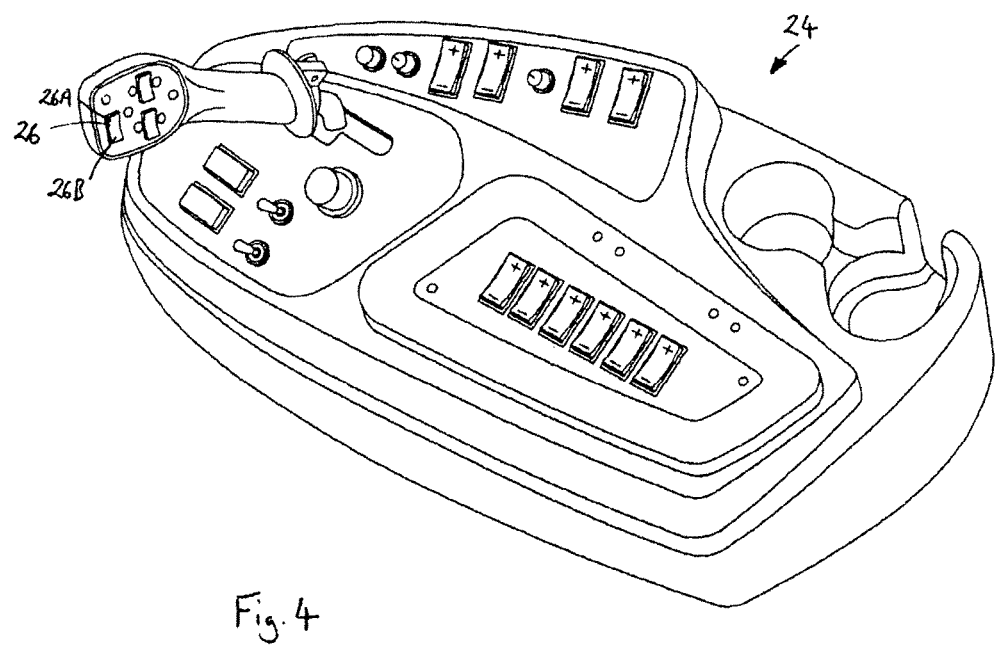
FIG. 4 is a schematic diagram showing a perspective view of an example embodiment of an operator console including a conveyor engagement/disengagement button and a swing in and swing out button on a joystick of the operator console.

The unloading conveyor swing control system embodied in combine 10 includes an operator console 24 shown in FIG. 4 and including a rocker switch 26 having an out-button 26a and an in-button 26b. An operator can utilise switch 26 to issue commands to the control system 40 wherein depression of out-button 26a equates to a command to increase the deployment angle of the auger tube 12 and depression of in-button 26b equates to a command to reduce the angle of the auger tube 12.

Figure 5:
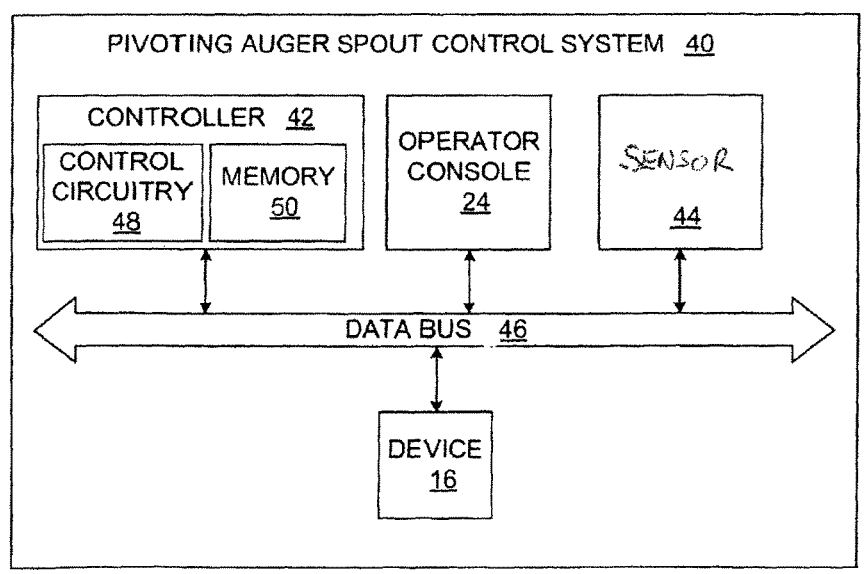
FIG. 5 is a block diagram that illustrates an embodiment of an example unloading conveyor swing control system; and, FIG. 6 is a flow chart that illustrates the operation of the controller embodied within an example unloading conveyor swing control system.

FIG. 5 shows the unloading conveyor swing control system 40 in the form of block diagram wherein the system utilises a data bus 46 to place into communication controller 42, operator console 24, actuator 16 and sensor 44.

The controller 42 comprise control circuitry 48 which may be embodied as custom made or commercially available processor, a central processing unit or an auxiliary processor among several processors, a semi-conductor based micro-processor (in the form of a micro-chip), a macro processor, one or more applications specific integrated circuits, a plurality of suitably configured digital logic gates, and/or other well-known electrical configurations comprising discrete elements both individually and in various combinations to coordinate the overall operation of the harvester 10.

The controller 42 further comprises memory 50. The memory 50 may include any one of a combination of volatile memory elements and non-volatile memory elements. The memory 50 may store a native operating system, one or more native applications, emulation systems, emulated applications for any of a variety of operating systems and/or emulated hardware platforms, emulated operating systems etc. For example, control of the actuator 16 may be implemented through software or firmware executing on a processor of the control circuitry 48. The memory 50 may be separate from the controller 42 or may be omitted.

In addition to the component shown, it should be appreciated that controller 42 may be in communication with other devices such as the clutch to selectively engage and disengage drive of the unloading auger. However, these other components are not relevant to the invention and further discussion will not be given.

Operation

Figure 6:
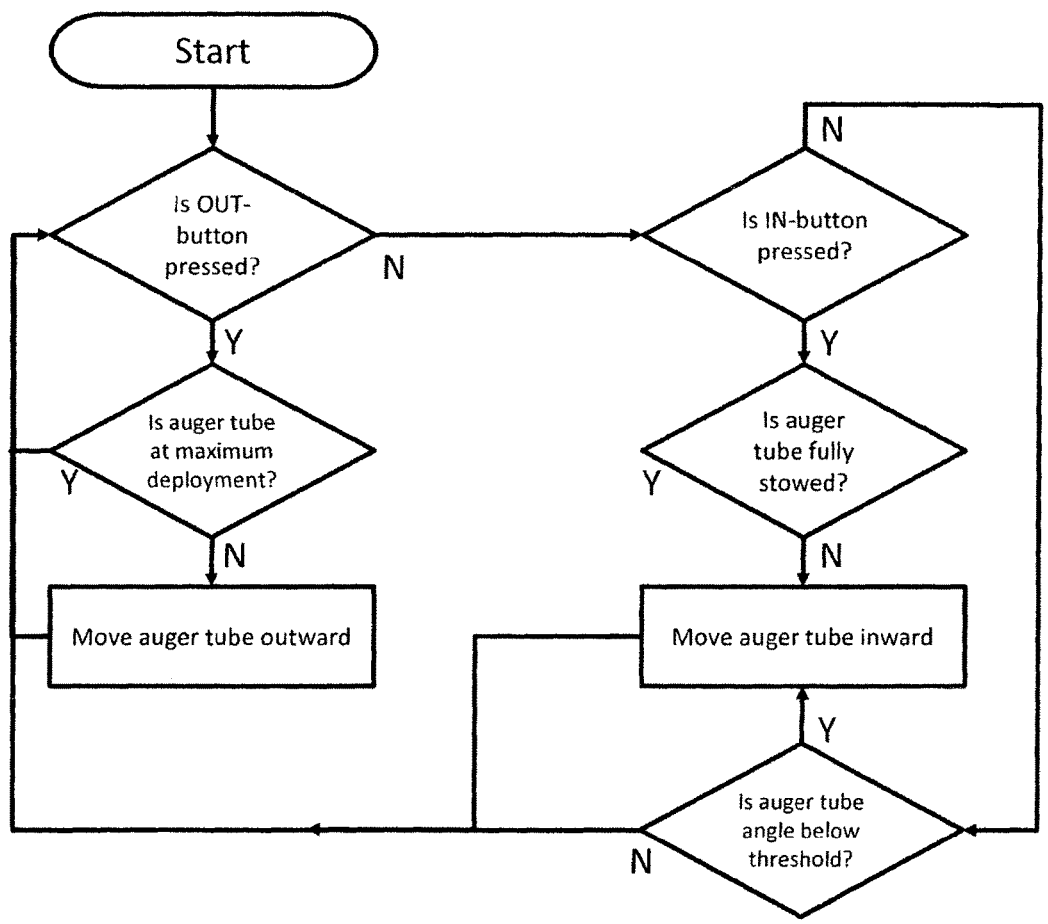

Turning to FIG. 6 operation of control system 40 is illustrated in a flow chart. Controller 42 repeatedly queries whether the out-button 26a or in-button 26b has been pressed by the operator. If the operator presses out-button 26a then, unless the auger tube 12 is sensed as being at over-centre position D2, then the auger tube 12 is moved outward until either it reaches the end of movement range M or the operator removes pressure from the out button 26a.

If the operator presses the in-button 26b then, unless the auger tube is sensed as being in the fully stowed position S, then the auger tube 12 is moved inwardly (reduction in deployed angle). If, when the operator removes pressure from in button 26b, the sensed angular position is below the pre-entered threshold, then, in accordance with the invention, the auger tube 12 is automatically swung into the stowed position S. If, however, the sensed angular position is greater than the threshold then movement of the auger tubes ceases.

In operation therefore, during an unloading sequence in which grain is discharged into a cart 100, the operator can use rocker switch 26 to move auger tube 12 within an operating range defined between D2 and D3. When unloading is complete, the operator need only command the movement of auger tube 12 to an angular position below the pre-determined threshold where upon the controller 42 automatically swings the auger tube 12 in to the stowed position S.

The threshold angle below which the conveyor is automatically stowed can be set by the operator through a suitable user interface device. Alternatively, the threshold angle may be fixed and determined by the manufacturer. In the illustrated example, the threshold angle is shown at D3.

To deploy the auger tube 12 at the start of an unloading sequence, the control circuitry 48 may be configured so that only a single press of out button 26a is required where upon the auger tube 12 is swung to a position within the operating range, position D2 for example.

It should be understood that rocker switch 26 serves to fine tune the position of auger tube 12 during unloading and also to fully fold and deploy the auger tube.

It should be appreciated that other devices may be employed in the operation and/or control of the combine harvester 10 that are not shown for brevity, including global positioning devices (e.g., GPS devices), display devices, among other components.

Where the controller 42 is implemented at least in part in logic configured as software/firmware (e.g., generally, an application), it should be noted that the application can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The application may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

Where the controller 42 is implemented at least in part in logic configured as hardware, the controller 142 may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The controller 142 is implemented using hardware, software, or a combination of hardware and software.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

The invention claimed is:

1. An unloading conveyor swing control system comprising:
   an unloading conveyor fitted to a self-propelled harvesting machine, the conveyor being moveable around a pivot axis through a movement range between a first, stowed, position and a second position;
   an actuator connected to the conveyor and arranged to move the conveyor throughout the movement range;
   a sensor configured to sense an angular position of the conveyor within the movement range and generate a representative position signal;
   a user interface device for receiving user-commands to move the conveyor;
   a controller in communication with the sensor, the actuator and the user interface device; wherein the conveyor is automatically moved into the first position in response to said angular position falling below a pre-determined threshold angle.

2. The control system according to claim 1, wherein the conveyor is deployed when in the second position.

3. The control system according to claim 2, wherein the movement range is greater than 90 degrees.

4. The control system according to claim 1, wherein the movement range comprises an operating range defined between the threshold angle and the second position.

5. The control system according to claim 1, wherein the threshold angle is user-adjustable.

6. The control system according to claim 1, wherein the user interface device comprises a first press-button for increasing the angular position, and a second press button for decreasing the angular position.

7. The control system according to claim 4, wherein the user interface device comprises a first press-button for increasing the angular position, and a second press button for decreasing the angular position and the conveyor is automatically moved into the operating range in response to user-operation of the first press button.

8. The control system according to claim 1, wherein the sensor comprises a potentiometer coupled to the conveyor.

9. A combine harvester comprising a control system according to claim 1.

10. The combine harvester according to claim 9, wherein the unloading conveyor comprises a tube, an auger rotationally housed within the tube, and a discharge spout, the tube being pivotally mounted to a frame of the combine harvester.

* * * * *